United States Patent [19]

Yata et al.

[11] Patent Number: 4,708,435
[45] Date of Patent: Nov. 24, 1987

[54] REAR PROJECTION SCREEN

[75] Inventors: Yukio Yata, Chiba; Shingo Suzuki, Zama, both of Japan

[73] Assignee: Mitsubishi Rayon Co., Ltd., Tokyo, Japan

[21] Appl. No.: 925,723

[22] Filed: Oct. 30, 1986

[51] Int. Cl.$^4$ .................. G03B 21/60; G03B 21/22; G03B 21/28
[52] U.S. Cl. ................................. 350/129; 353/77
[58] Field of Search ............... 350/127–129; 353/27 R, 77

[56] References Cited

U.S. PATENT DOCUMENTS

| | | | |
|---|---|---|---|
| 2,974,565 | 3/1961 | Miller | 350/128 X |
| 3,236,150 | 2/1966 | Miller | 350/129 |
| 3,463,569 | 8/1969 | Bratkowski | 350/129 |
| 4,147,408 | 4/1979 | Plummer | 350/128 |
| 4,165,920 | 8/1979 | Brown | 350/127 X |
| 4,185,901 | 1/1980 | Behr | 350/127 X |
| 4,339,183 | 7/1982 | Yamada et al. | 353/78 |
| 4,418,986 | 12/1983 | Yata et al. | 350/128 |
| 4,439,027 | 3/1984 | Shioda et al. | 353/77 |
| 4,469,402 | 9/1984 | Yata et al. | 350/128 |
| 4,482,206 | 11/1984 | Van Breemen | 350/128 |
| 4,509,822 | 4/1985 | Clausen et al. | 350/128 |
| 4,512,631 | 4/1985 | Van Breemen | 350/128 |
| 4,561,720 | 12/1985 | Clausen et al. | 350/128 |

Primary Examiner—Richard A. Wintercorn
Attorney, Agent, or Firm—Brumbaugh, Graves, Donohue & Raymond

[57] ABSTRACT

A rear projection screen is provided for observing an image by introducing light from the rear side of the screen at a sharp angle. The screen has a plane of incidence which comprises a plurality of prisms extending in lines or arcs. Each prism has a total reflection surface which totally reflects incident light so that the light emerges toward an observer and a surface opposite to the total reflection surface, and toward the total reflection surface and/or the opposite surface having a curved surface so that the luminous flux of the totally reflected light is once converged and is then diffused.

13 Claims, 26 Drawing Figures

REAR PROJECTION SCREEN

BACKGROUND OF THE INVENTION

The present invention relates to a rear projection screen for use in a projection television set and the like.

As shown in FIG. 1, a rear projector used in a video projection television set is adapted to expand light emerging from a light source (P), e.g. a CRT, by means of a lens system (L), project the light from the rear side of a screen (S), and allow a viewer to observe a picture from the opposite side of the screen (S). However, if the distance from the light source (P) to the screen (S) is prolonged as shown, the projector becomes large size. In practice, therefore, a method is adapted whereby one to three mirrors (M) are combined, and the light is projected after being reflected on them once, as shown in FIGS. 2 (A), 2(B), 2(C). However, there have been drawbacks in that, in the method of FIG. 2(A), the height of the projector becomes large, while, in the methods of FIGS. 2(B) and 2(C), it cannot be said positively that the projectors have been made sufficiently compact in terms of the height and depth.

Many types of screens used for such a projector are provided with a circular Fresnel lens on the incidence side, thereby providing a means for allowing every corner of such screens to be brightly when viewed. However, since lens surfaces (a) are continuously formed via non-lens surfaces (b), as shown in FIG. 3, this circular Fresnel lens has a drawback in that the light incident upon the non-lens surfaces (b) indicated by the oblique lines do not converge, thereby reducing the efficiency of the Fresnel lens and adversely affecting the resolution. To prevent this from occurring, a measure is adopted in some cases to dispose the lens surfaces of the Fresnel lens to receive the light from the flat surface and to combine the Fresnel lens with a lenticular lens. However, such an arrangement of the screen with two lenses has disadvantages since the structure of the screen becomes complicated, the picture fades due to the flare occurring between the two lenses, and the efficiency of utilization of light declines.

In addition, screen apparatus which is capable of reducing the depth of a projector, those which are disclosed in Japanese Patent Unexamined Publication Nos. 57120/1983 and 9649/1984 are known, which propose introducing the light obliquely with respect to a screen, thereby reducing the depth of a projector system. However, since these apparatuses make use of the refraction of a lens, there has been a limit to enlarging the angle of incidence.

To overcome these drawbacks, a rear projection screen has been proposed for observing an image by introducing light at a sharp angle from the rear, characterized in that a plurality of prisms are provided in parallel with each other on the light incidence surface, each having a total reflection surface, so that the incident light is totally reflected on the total reflection surface of the screen and is then emerged from the front viewing surface of the screen [Japanese patent application Nos. 2996/1984 and 47936/1985 (corresponding to U.S. Ser. No. 837,412)].

Furthermore, prior to the above-described proposal made by the applicants, a projector having a similar arrangement is known (Japanese Patent Unexamined Publication No. 109481/1982).

By utilizing the above-described proposal, it has become possible to provide a rear projection screen which enables the projector to be made compact by reducing the dimensions in depth and height and which provides sufficient brightness without reducing the resolving power.

SUMMARY OF THE PRESENT INVENTION

The present invention has been achieved as a result of carrying out studies with a view to further increasing the resolving power, reducing the effect of external lights, and effectively utilizing the quantity of light made available.

Namely, the present invention has successfully attained the above purpose and its gist lies in the provision of a rear projection screen for observing an image by introducing light from the rear side thereof at a sharp angle, characterized in that the plane of incidence of this screen comprises a plurality of prisms extending in lines or arcs, each of the prisms having a total reflection surface which totally reflects incident light so that the light emerges toward an observer and a surface opposite to the total reflection surface, and the total reflection surface and or the opposite surface having a curved surface so that the luminous flux of the totally reflected light is once converged and is then diffused.

Description of the preferred embodiments of the present invention will be made hereinafter with reference to the drawings.

BRIEF DESCRPTION OF THE DRAWINGS

FIG. 1 and FIGS. 2(A) to 2(C) are schematic side elevational views explaining a passage of light introduced from a projector to a conventional rear projection screen;

FIG. 3 is a partially cutaway side elevational view of a Fresnel lens used in a conventional rear projection screen;

FIG. 4, FIGS. 5(A) and 5(B) are schematic side elevational views explaining a passage of light introduced from a projector to a rear projection type screen according to the present invention;

PREFERRED EMBODIMENTS OF THE INVENTION

Figure 1:
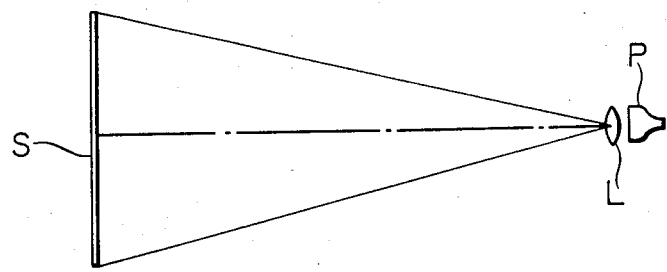
Figure 2A:
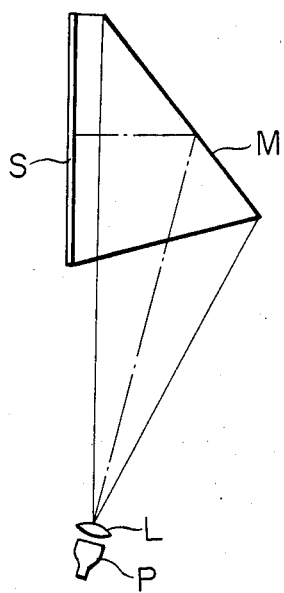
Figure 2B:
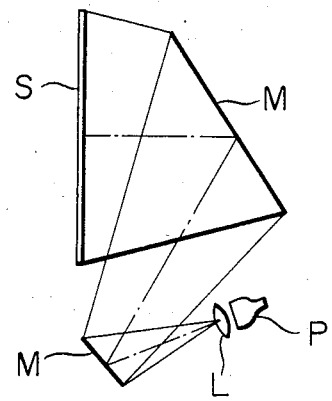
Figure 2C:
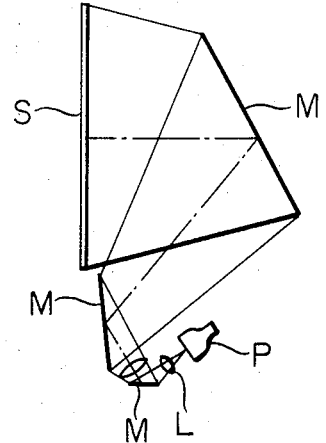
Figure 3:
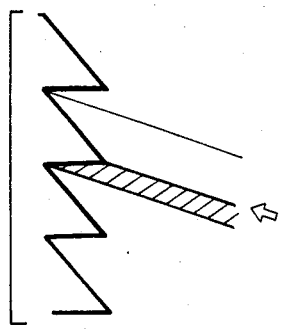
Figure 4:
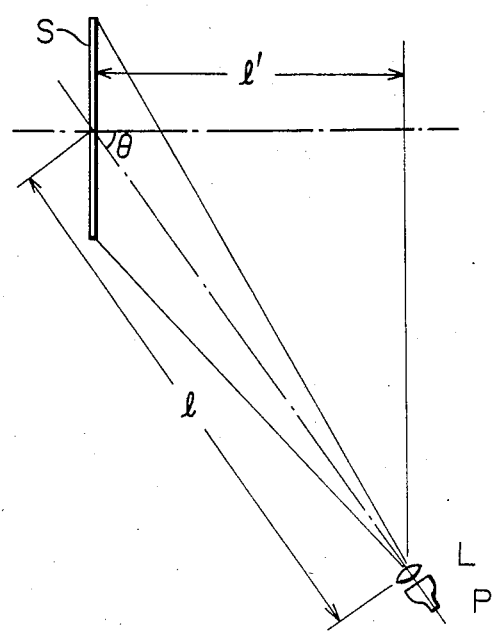

FIG. 4 is a schematic drawing explaining the basic arrangement of the rear projection type screen according to the present invention, in which reference character P denotes a light source, such as a CRT; L, a lens system; and S, a rear projection screen. Light introduced from the light source P is adapted to be made incident upon the rear surface of the rear projection screen S at a sharp angle. The angle θ of incidence upon the rear projection screen S is generally dependent upon the distance of light projection, but preferably is in a range from 40° to 85°. The distance l from the light source P to the rear projection screen S is the same as that adopted in a conventional method, but, since the light source P is located diagonally downward, a distance l' in the direction of the depth is:

$$l' = l \cos \theta$$

so that l' can be made relatively small in comparison with l.

Figure 5A:
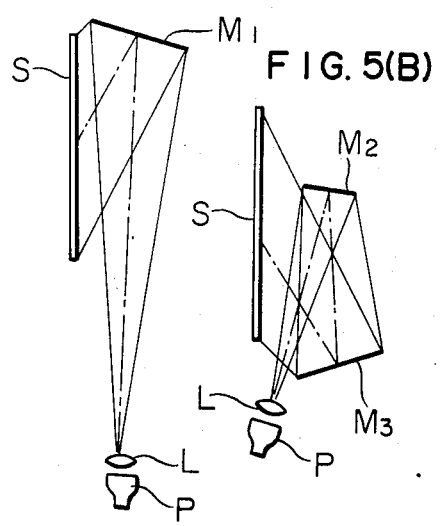
Figure 5B:
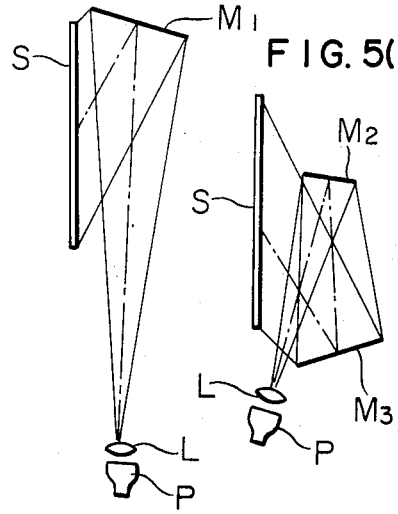

However, since the height of the projection set may not be always made sufficiently low, it is desirable in practice to reduce the height by employing a mirror $M_1$, as shown in FIG. 5(A), and to reduce the length in the direction of the depth as well. In addition, in order to further reduce the height so as to make the overall dimensions smaller, two mirrors $M_2$ and $M_3$ may be combined, as shown in FIG. 5(B), and light source P may be interposed between the rear projection screen S and the first mirror $M_2$ so as to project the light after being reflected twice.

Figure 6:
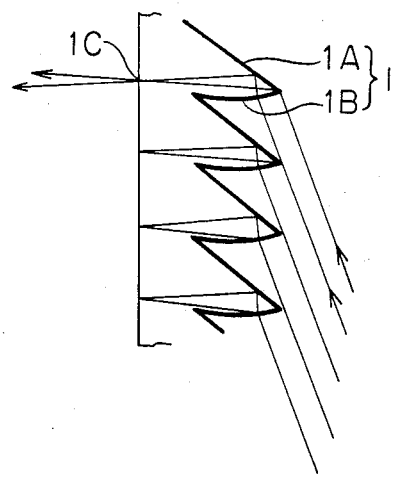
FIG. 6 is a partial cross-sectional view explaining the state of light introduced to the rear projection type screen according to the present invention.

FIG. 6 illustrates a portion of the rear projection screen of the present invention, and, in this embodiment, a plurality of prisms having the same configuration are provided on the rear surface of the rear projection screen. In other words, these prisms are constituted by a plurality of prisms 1 extending along lines or concentric circular arcs in parallel and each prism 1 has a total reflection surface 1A totally reflecting the incident light and allowing it to emerge it toward the viewing side and the opposite surface 1B corresponding to an incidence surface.

Figure 7:
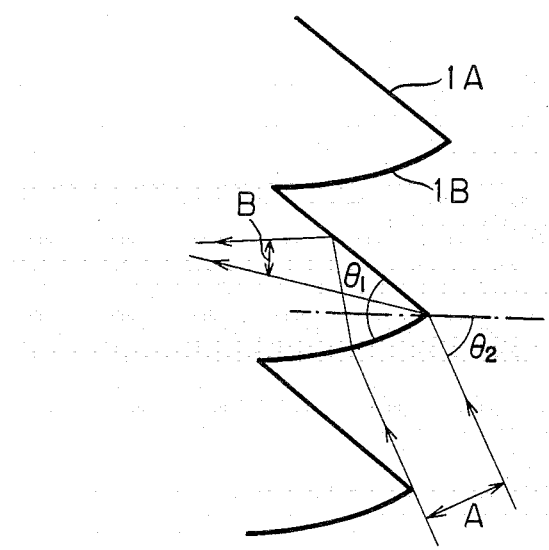
FIGS. 7 and 8 are partial cross-sectional views explaining in detail the state of the light.
Figure 8:
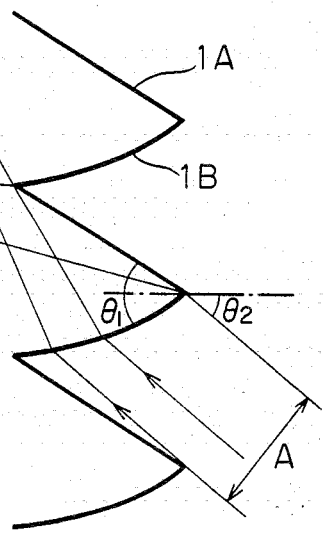

FIGS. 7 and 8 explain in detail the light incident upon the prism 1 in the present invention, FIG. 7 being an enlarged view of a portion thereof in the case of a relatively large angle of incidence $\theta_1$ and FIG. 8 being an enlarged view of a portion thereof in the case of a relatively small angle of incidence $\theta_2$. In FIG. 7, the light incident upon the opposite surface 1B is converged 1C (see FIG. 6) because this surface is an externally curved convex surface, and the luminous flux B of the totally reflected light becomes smaller than that of the incident light A. Such phenomenon of convergence is similarly found in the arrangement shown in FIG. 8. Once light has converged, it diffuses during its passage so that the field of vision can be enlarged in the vertical direction.

The prisms used in the present invention may comprises a plurality of parallel prisms which linearly extend. However, although this arrangement has the advantage in that light can be controlled in one direction, for example, the vertical direction, it cannot be controlled in the horizontal direction at the same time. To overcome this, the prisms may be arranged in concentric circular arcs, as shown in FIG. 9.

That is to say, assuming that the light source for projection, e.g. a CRT, is P and O is the center of the concentric circular arc in a plane F including the screen S is O, and if a segment OP is made perpendicular to the plane F, each point on the same arc becomes equidistant from the light source P. Consequently, by making the cross sections of the prism 1 along this circular arc identical, the angles of emergence from the cross sections of the prism become equal, resulting in the design becoming less complicated, and, furthermore, it is possible to realize a well-balanced screen S which is capable of controlling the light not only in the vertical direction but also in the horizontal direction.

Figure 9:
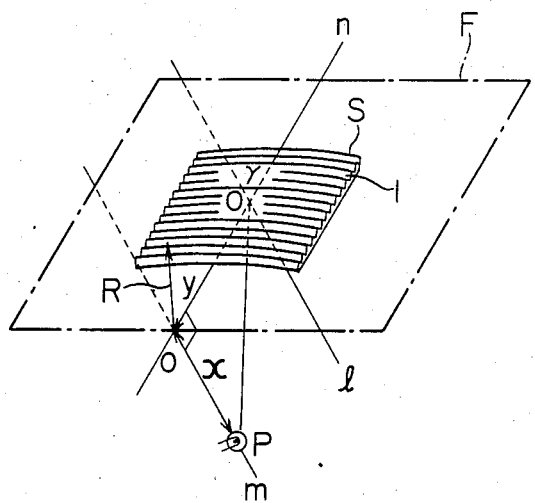
FIG. 9 is a perspective view showing another embodiment according to the present invention.

Assuming now that distance between the light source P and the center O' of the arcs is x and the distance between the center O of the screen S and the center O' of the arcs is y, as shown in FIG. 9, the open angle of the prism at a point having distance γ (upwardly positive) from the center of the vertical axis passing through the center O of the screen is $\theta_1$, and the inclination of the light incidence surface of the prism is $\theta_2$, then $\theta_2$ in the case of parallel emergence can be obtained in conformity to the following Formula 1 (wherein n is an index of refraction):

$$\tan \theta_2 = \left\{ \frac{(r+y)}{\sqrt{x^2 + (r+y)^2}} + n \sin 2\theta_1 \right\} / \left\{ \frac{x}{\sqrt{x^2 + (r+y)^2}} - n \cos 2\theta_1 \right\} \quad (1)$$

If the cross-sectional configuration of the prisms 1 is made into one expressed by the above Formula (I) all the rays of light emerging from the surface of the screen S become parallel rays of light which are normal to the screen S. Hence, it becomes possible to obtain a screen which is more compact and displays a more uniform brightness as compared with a conventional screen having a Fresnel lens.

The above formula 1 is based on the assumption that the opposite surface 1B and the total reflection surface 1A, respectively, are straight lines, so that according to the present invention $\theta_2$ can be approximately obtained by supposing that light passing through the center of fax of light incident upon the respective prisms is a tangent at the point of total reflection.

Figure 10:
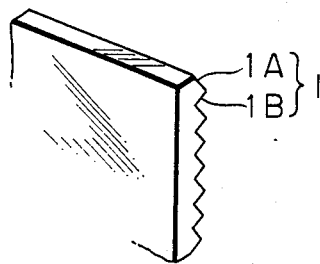
FIGS. 10 to 17 are partially perspective views illustrating various other embodiments according to the present invention.
Figure 11:
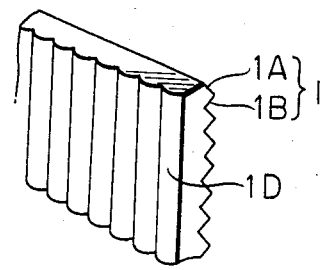
Figure 12:
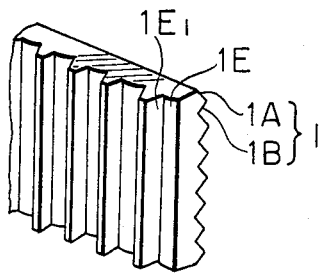
Figure 13:
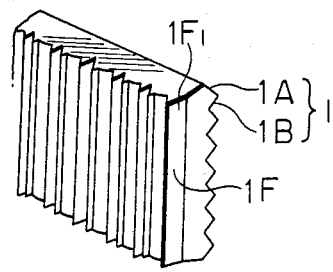

FIGS. 10 to 17 show various embodiments, in part, of the present invention. FIG. 10 shows a most basic rear projection screen, in which are formed a plurality of prisms 1 each having a total reflection surface 1A and an opposite surface 1B on the projection side. FIG. 11 shows a rear projection screen in which a lenticular lens surface 1D extending vertically is formed on the viewing side in the embodiment shown in FIG. 10, and this lenticular lens surface 1D imparts the horizontally diffusing characteristics of the light. In addition, FIGS. 12 and 13 show rear projection screens in which lenticular lens surfaces 1E, 1F having total reflection surfaces 1E, 1F are similarly formed on the viewing side thereof, respectively, thereby making it possible to obtain even greater horizontal diffusing characteristics of light, i.e., a greater field of vision.

Further, such total reflection surfaces formed in the lenticular lens surface allow the light rays totally reflected thereon to emerge from the screen over a wide viewing angle, and therefore to cross each other so that it is possible to enhance the mixing of colors in the case of color television sets. Since the arrangement and operation of lenticular lens surfaces 1E, 1F having total reflection surfaces shown in FIGS. 12 and 13 are described in detail in Japanese patent application Nos. 51194/1981 and 90544/1981, (corresponding to U.S. Pat. Nos. 4,418,986), 91896/1981 (corresponding to U.S. Pat. No. 4,469,402), 212584/1981, 29178/1981

(corresponding to U.S. Pat. No. 4,468,092) and 59389/1982 filed by the applicants, description of them will be omitted herein.

Figure 14:
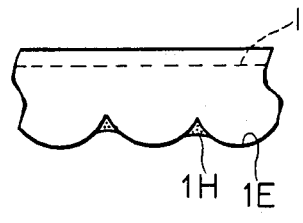
Figure 15:
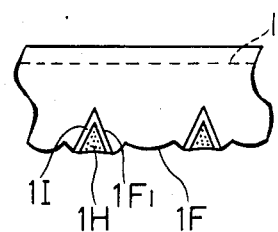

If a lenticular lens surface is formed on the viewing side, as shown in the embodiments of FIGS. 11 to 13, a portion which does not transmit light is formed on the lens surface, and an external light absorbing layer 1H may be formed by making use of this light nontransmissive portion, as shown in FIG. 14. In addition, if a lenticular lens surface having a total reflection surface is formed, as shown in FIGS. 12 and 13, it is possible to ensure that the light does not substantially emerge from this total reflection surface, so that an external light absorbing layer can be provided to this total reflection surface. In this case, the external light absorbing layer 1H may be provided via a reflection layer 1I made of a material having a smaller index of refraction than that of a substrate, as shown in FIG. 15, so that the function of the total reflection surface will not be deteriorated.

Figure 16:
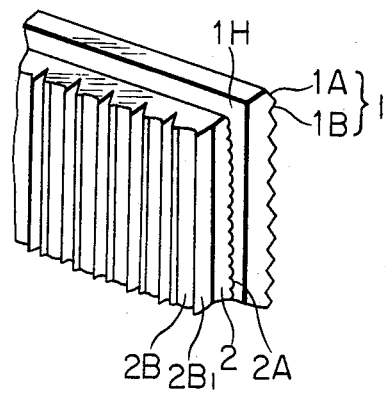
Figure 17:
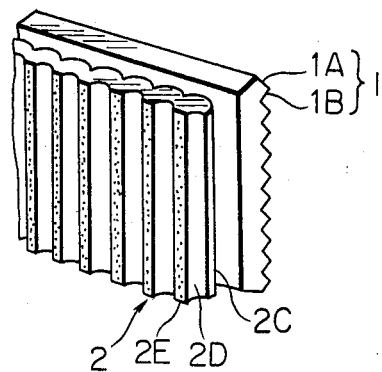

FIGS. 16 and 17 show embodiments of the present invention in which a separate lens sheet 2 is combined with the rear projection screen shown in FIG. 10, on the viewing side thereof. In the embodiment of FIG. 16, the rear projection screen is combined with such a separate sheet 2 having a lenticular lens surface 2A extending horizontally on the projection side thereof and a vertical lenticular lens surface 2B having a total reflection surface $2B_1$ similar to that of FIG. 13. This arrangement makes it possible to obtain a rear projection screen which has both horizontally and vertically diffusing characteristics of light. FIG. 17 shows another rear projection screen with which are combined a separate lens sheet 2 having a lenticular lens surface 2C extending vertically on the projection side and a concave lenticular lens surface 2D together with external light absorbing layers 2E. This arrangement makes it possible to increase the contrast and the horizontal diffusion characteristics of the light. Of course, in the embodiment of FIG. 16, an external light absorbing layer, as shown in FIG. 16, may be formed in the light nontransmissive portion of the lenticular lens 2B.

It has been stated that the above-mentioned external light layer is formed by making use of the light transmissive portion of each of lenticular lenses provided at the viewing side. However, according to the present invention, since the totally reflected light is diffused after it is once converged, the light transmissive and nontransmissive portions are sectioned distinctly from each other as shown in FIG. 6, and therefore, it is possible to form the external light absorbing layer along this light nontransmissive portion.

In the aforementioned embodiments, prisms 1 are disposed continuously such as to extend in a substantially horizontal direction, but the prisms 1 can be also be arranged such as to extend in the substantially vertical direction. It goes without saying that the projector should be disposed in the transverse direction in this case.

Furthermore, in the above-mentioned embodiments, the opposite surface 1B has an externally convex curved-surface so that the luminous flux of the light incident upon the opposite surface 1B is converged after it is totally reflected. To impart such a function, the total reflection surface 1A may have an externally convex curved-surface, or both the surfaces 1A and 1B may have the convex curved-surfaces.

With the rear projection screen according to the present invention, since an image is projected diagonally from the rear, a distortion may occur in the image and the fading of the image will occur. However, these problems can be overcome by taking the following measure in the projection system. In other word, the distortion of the image may be corrected by the electrical circuit of a CRT by taking account of an amount of distortion for each portion. Meanwhile, since the fading of the image results owing to a difference in the distance between the lens system and the screen, an image introduced from the CRT to the lens system may be given a predetermined angle with respect to the optical axis in such a manner as to form an equal focal length on the screen.

As to a material used for the rear projection screen of the present invention, acrylic resin is the most suitable. The reason is that acrylic resin is particularly superior in terms of optical and fabrication characteristics, and fabrication efficiency while having a suitable rigidity. However, instead of acrylic resin, it is also possible to use polyvinyl chloride resin, polycarbonate resin, olefin resin, and styrene resin. When these synthetic resin materials are used, it is possible to fabricate a rear projection screen pertaining to the present invention by means of extrusion molding, heating press, or injection molding.

Furthermore, a light diffusing means for further enhancing the light diffusing characteristics may be added to the base material the rear projection screen of the present invention separate sheet. As for this light diffusing means, one or two or more kinds of additives of diffusing materials which are not dissolved in or undergo chemical change by a liquid synthetic resin syrup and molten medium, including $SiO_2$, $CaCO_3$, $Al_2O_3$, $TiO_3$, $BaSO_4$, $ZnO$, $Al(OH)_3$, fine glass powders, and an organic diffusing agent, may be mixed and distributed in the medium such as to be dispersed uniformly in a synthetic resin constituting the substrate, e.g., acrylic resin, or a layer including such diffusing materials may be provided to the screen. Furthermore, it is also effective to form a fine matted surface on the projection-side screen surface and/or the viewing-side screen surface. If such a means for imparting light diffusing characteristics is adopted, the diffusion of light in the horizontal and vertical directions of the screen can be compensated, thereby enabling enhancement of the uniformity of the diffusion of light.

Further, according to the invention, the field of vision can be enlarged in the vertical direction, the use amount of the above-mentioned light diffusing material can be reduced remarkably so that the energy efficiency of transmitting light may be enhanced.

EXAMPLE 1

A rear projection screen, substantially as shown in FIG. 9, was manufactured from a transparent acrylic resin sheet (3 mm thick) with a refractive index of 1.49 containing $SiO_2$ as a light diffusing material by means of hot press molding.

Figure 18:
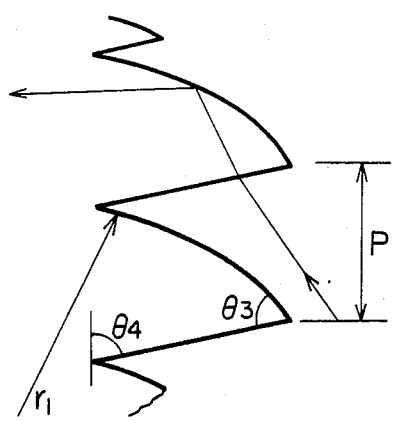
FIGS. 18 and 19 are sectional views of parts of the prism and the lenticular lens used in the example of the present invention.

The specifications of the thus obtained prism on the screen were as follows and its configuration is shown in FIG. 18.

Figure 19:
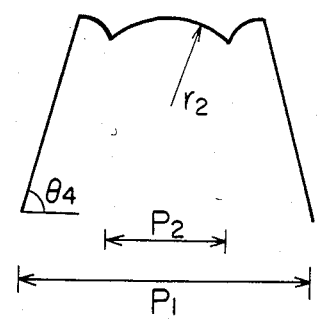

Position of the light source:
x rearward of the screen=620 mm
y downward of the center of the screen=885 mm
(Light is made incident upon the center of the screen at an angle of 55° with respect to the plane of the screen.)
Vertical angle of the prism: $\theta_3 = 50°$ Center of the circular arc of the prism:
1,000 mm downward of the vertical axis from the center of the screen
Pitch of the prism: P=0.5 mm
Size of the screen:
700 mm (height)
900 mm (width)
Radius of curvature of the total reflection surface: $\gamma_1 = 2.223$ mm The angle $\theta_4$ of inclination of each prism was set to the angle calculated from Formula (1). In this example, the screen had the vertical lenticular lens on the viewing side thereof, as shown in FIG. 13. This lens had the configuration, as shown in FIG. 19, and the angle and the lengths were as follows:
Inclination of the total reflection surface:
$\theta_4 = 75°$;
$P_1 = 0.7$ mm;
$P_2 = 0.275$ mm;
$\gamma_2 = 0.2$ mm.

By way of a comparison, a screen was experimentally produced, which was the same as the above example except that the total reflection surface of the prism was linear.

Figure 20:
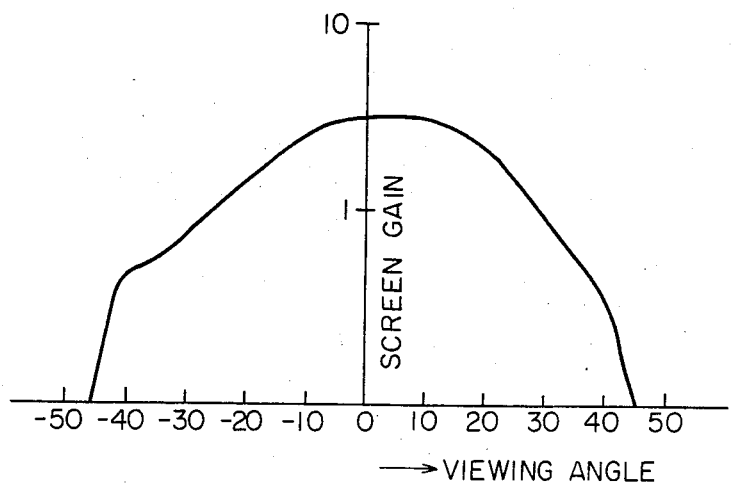
FIG. 20 is a graph showing the quantity of transmitted light in the example of the present invention.
Figure 21:
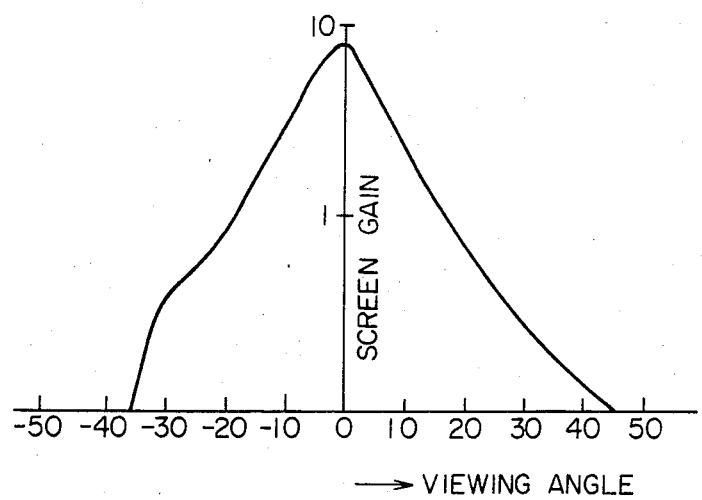
FIG. 21 is a graph showing the quantity of transmitted light in a comparative screen.

The measurement of the amount of transmitted light in the vertical direction of the screen of this example showed well-balanced light transmission, as shown in FIG. 20. However, the comparative screen exhibited an extremely high gain at an angle of 0°, as shown in FIG. 21, and a poor balance of light transmission in the vertical direction. The difference in the amount of transmitted light between the two screens results in a difference in color balance when the screens are installed in a color projection television set, and, therefore, it was found that the present invention is superior to the comparative screen. In addition, in this example, the $\alpha$ value of the present invention was 24.3° and the $\beta$ value thereof was 28.8°, while the values $\alpha$ and $\beta$ of the comparative screen were 5.3° and 8.7°, respectively.

In FIGS. 20 and 21, the term "screen gain" means a gain of light transmitted through a screen, and can be expressed by the following formula:

$$\text{Gain} = \frac{\text{foot Lambert (ft } - L)}{\text{foot Candela (ft } - Cd)}$$

The $\alpha$ value is an angle of visibility at the gain of $\frac{1}{2}$ and the $\beta$ value is that at the gain of $\frac{1}{3}$.

Figure 22:
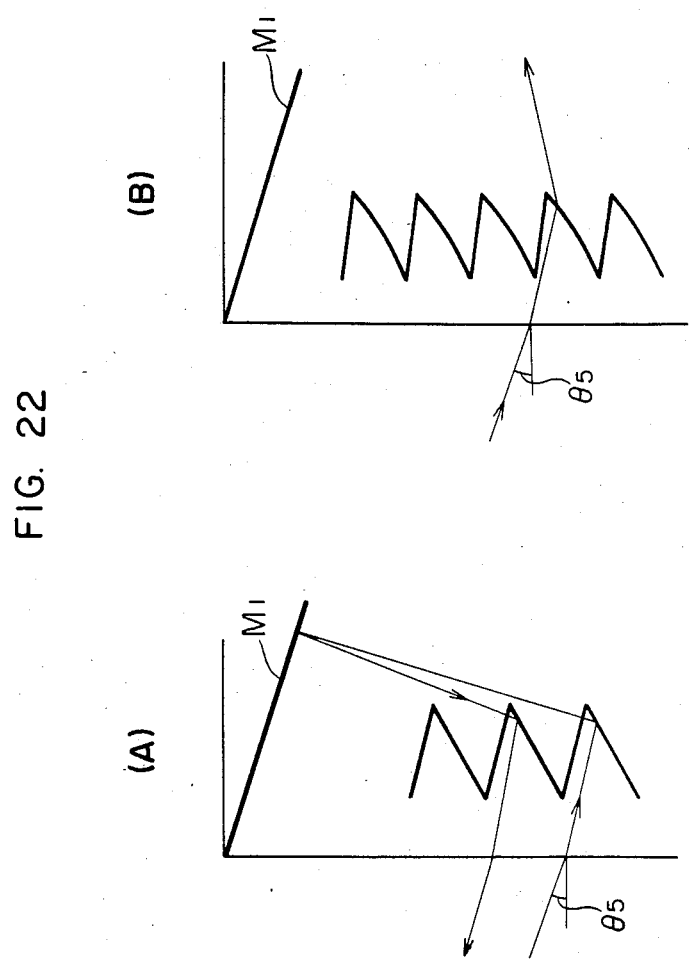
FIGS. 22(A) and 22(B) are views explaining the effect of external lights in the example of the present invention and the comparative screen.

The effect of external light was studied in order to confirm the effects of the rear projection screen of the present invention. Namely, the screen of the present invention is often projected via a mirror, as shown in FIG. 5(A), and, in this case, a certain light incident from the outside of the screen (i.e., on the viewing side) is reflected on the mirror, made incident again on the screen, and emerges to the viewing side, the light becoming a kind of "stray light" which has an adverse effect upon quality of the screen. This relationship is shown in FIG. 22(A), in which the light incident from the viewing side at $\theta_5 = 20°$ is reflected on the mirror $M_1$, as shown in the figure, and emerges again, but, in the screen of the present invention, the light incident in a similar manner does not reach the mirror $M_1$ and thus no "stray light", as described above occurs.

The present invention having the aforementioned arrangements has advantages in that, since light introduced onto the rear of the screen at a sharp angle can be emerged uniformly from the viewing surface with high efficiency by virtue of the configuration of the prisms and the action of the total reflection, it becomes possible to locate the relative position of a projector serving as a light source obliquely rearward when the rear projection screen of the present invention is used, thereby making it possible to make the entire projector compact, and that a rear projection screen exhibiting a uniform brightness, little affect of external light, and enlarged field of vision in vertical direction can be easily provided.

What is claimed is:

1. A rear projection screen in which a light is introduced from a rear surface at a sharp angle for viewing an image, comprising a plurality of prisms extending along lines or circular arcs provided on said rear surface, and each prism constituting said prisms has a total reflection surface which totally reflects the incident light and emerges to a viewing side, said total reflection surface and/or the surface opposite to said total reflection surface having curved surface so that the luminous flux of the totally reflected light, is converged and then diffused.

2. A rear projection screen according to claim 1 comprising lenticular lens surfaces vertically extending on the viewing side.

3. A rear projection screen according to claim 2 comprising lenticular lens surfaces provided with total reflection surfaces.

4. A rear projection screen according to claim 2 or 3, characterized in that an external light absorbing layer is formed on the light nontransmissive portion of said lenticular lens.

5. A rear projection screen according to claim 3, characterized in that an external light absorbing layer is formed on said total reflection surfaces through a light reflecting layer.

6. A rear projection screen according to any one of claims 1 to 5 characterized by having a circular Fresnel lens on said viewing side.

7. A rear projection screen according to any one of claims 1 to 6, characterized in that a substrate constituting said screen is provided with a light diffusing means.

8. A rear projection screen according to any one of claims 1 to 3 characterized by being combined with a separate sheet having a lenticular lens surface.

9. A rear projection screen according to claim 8, characterized in that an external light absorbing layer is formed on the light nontransmissive portion of the lenticular lens of said separate sheet.

10. A rear projection screen according to claim 8 or 9, characterized in that said separate sheet is provided with a light diffusing means.

11. A rear projection screen according to claim 1, wherein the total reflection surface of each prism has a curved surface.

12. A rear projection screen according to claim 1, wherein the surface of each prism opposite to said total reflection surface of each prism has a curved surface.

13. A rear projection screen according to claim 1, wherein the total reflection surface of each prism and the surface opposite of each prism to said total reflection surface have curved surfaces.

* * * * *